Figure 1:
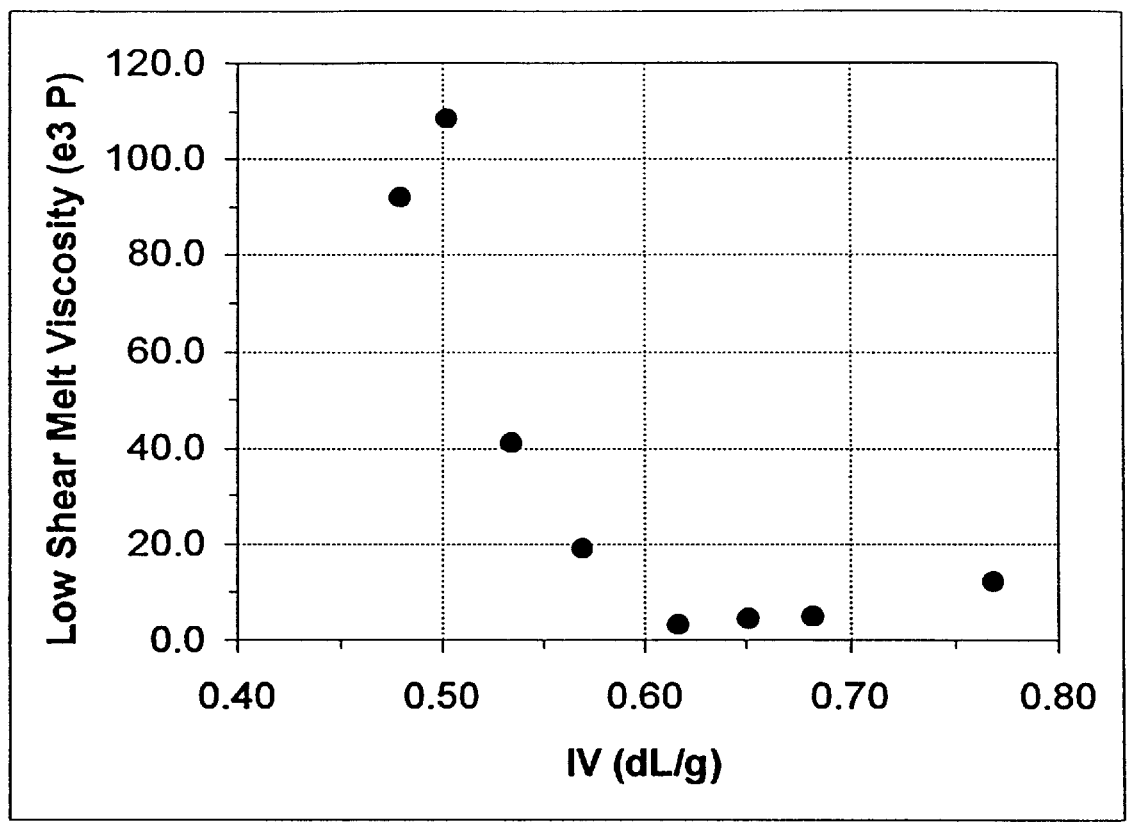

United States Patent

Matayabas, Jr. et al.

[11] Patent Number: 6,084,019
[45] Date of Patent: Jul. 4, 2000

[54] HIGH I.V. POLYESTER COMPOSITIONS CONTAINING PLATELET PARTICLES

[75] Inventors: James Christopher Matayabas, Jr.; Sam Richard Turner; Bobby Jones Sublett, all of Kingsport; Gary Wayne Connell, Church Hill; John Walker Gilmer; Robert Boyd Barbee, both of Kingsport, all of Tenn.

[73] Assignee: Eastman Chemical Corporation, Kingsport, Tenn.

[21] Appl. No.: 08/996,063

[22] Filed: Dec. 22, 1997

Related U.S. Application Data

[60] Provisional application No. 60/053,573, Jul. 21, 1997, and provisional application No. 60/034,134, Dec. 31, 1996.

[51] Int. Cl.$^7$ .................................................. C08K 3/34
[52] U.S. Cl. .................. 524/445; 428/36.92; 428/333; 428/338; 428/339; 524/446; 524/447
[58] Field of Search ................................. 524/445, 446, 524/447; 528/308.2, 282, 485; 428/36.92, 333, 338, 339

[56] References Cited

U.S. PATENT DOCUMENTS

| | | | |
|---|---|---|---|
| 3,544,523 | 12/1970 | Maxiom | 528/308.2 |
| 3,627,625 | 12/1971 | Jarrett | 161/165 |
| 3,876,552 | 4/1975 | Moynihan | 161/5 |
| 4,064,112 | 12/1977 | Rothe et al. . | |
| 4,161,578 | 7/1979 | Herron . | |
| 4,163,002 | 7/1979 | Pohl et al. . | |
| 4,442,163 | 4/1984 | Kuhner et al. | 524/436 |
| 4,472,538 | 9/1984 | Kamigaito et al. . | |
| 4,536,425 | 8/1985 | Hekal . | |
| 4,546,126 | 10/1985 | Breitenfellner et al. . | |
| 4,595,715 | 6/1986 | Kuze et al. | 428/338 |
| 4,676,929 | 6/1987 | Rittler . | |
| 4,739,007 | 4/1988 | Okada et al. . | |
| 4,777,206 | 10/1988 | Rittler . | |
| 4,810,734 | 3/1989 | Kawasumi et al. . | |
| 4,889,885 | 12/1989 | Usuki et al. . | |
| 4,894,411 | 1/1990 | Okada et al. . | |
| 5,091,462 | 2/1992 | Fukui et al. . | |
| 5,102,948 | 4/1992 | Deguchi et al. . | |
| 5,153,062 | 10/1992 | Grolig et al. . | |
| 5,164,440 | 11/1992 | Deguchi et al. . | |
| 5,164,460 | 11/1992 | Yano et al. . | |
| 5,248,720 | 9/1993 | Deguchi et al. . | |
| 5,374,306 | 12/1994 | Schlegel et al. | 106/404 |
| 5,382,650 | 1/1995 | Kasowski et al. . | |
| 5,385,776 | 1/1995 | Maxfield et al. . | |
| 5,414,042 | 5/1995 | Yasue et al. . | |
| 5,434,000 | 7/1995 | Konagaya et al. | 528/280 |
| 5,552,469 | 9/1996 | Beall et al. . | |
| 5,578,672 | 11/1996 | Beall et al. . | |
| 5,612,138 | 3/1997 | Kurz et al. | 428/338 |
| 5,620,774 | 4/1997 | Etchu et al. | 428/338 |
| 5,665,454 | 9/1997 | Hosoi et al. | 428/338 |
| 5,807,630 | 9/1998 | Christie et al. | 428/338 |
| 5,830,544 | 11/1998 | Kerscher et al. | 428/36.92 |
| 5,882,751 | 3/1999 | Occhiello et al. | 428/36.92 |

FOREIGN PATENT DOCUMENTS

| | | |
|---|---|---|
| 747451 A2 | 5/1919 | European Pat. Off. . |
| 0 186 456 | 7/1986 | European Pat. Off. . |
| 0 295 336 | 12/1988 | European Pat. Off. . |
| 780340 A1 | 1/1997 | European Pat. Off. . |
| 9-176461 | 7/1997 | Japan . |
| 1 090 036 | 11/1967 | United Kingdom . |
| 2 123 014 | 1/1984 | United Kingdom . |
| 97/31973 | 2/1919 | WIPO . |
| 95/06090 | 8/1919 | WIPO . |
| 93/04117 | 8/1992 | WIPO . |
| 93/04118 | 8/1992 | WIPO . |
| 93/11190 | 11/1992 | WIPO . |
| WO 93/04125 | 3/1993 | WIPO . |
| 94/11430 | 5/1994 | WIPO . |
| 95/14733 | 10/1994 | WIPO . |
| 97/31057 | 2/1997 | WIPO . |

OTHER PUBLICATIONS

D. J. Greenland, J. Collaid Sci. 18, 647 (1963).
Y. Sugahara et al., J. Ceraic Society of Japan 100, 413 (1992).
P.B. Messersmith et al., J. Polymer Sci.: Polymer Chem., 33, 1047 (1995).
C. O. Sriakhi et al., J. Mater. Chem. 6, 103 (1996).
Chemical Abstracts, vol. 107, No. 12, Sep. 21, 1987, Columbus, OH; abstract No. 97857, XP002063564 & JP 62 073 943 A (Teijin Ltd.) Apr. 4, 1987.
Database WPI, Week 9514, Derwent Publications Ltd., London, GB; AN 95–102048, XP002063566 & JP 07 026 123 A (Toyobo KK), Jan. 27, 1995.
Chemical Abstracts, vol. 126, No. 19, May, 12, 1997, Columbus, OH, abstract No. 251935, XP002063565 & JP 09 048 908 A (Toray Ind.), Feb. 18, 1997.

*Primary Examiner*—Veronica P. Hoke
*Attorney, Agent, or Firm*—Karen A. Harding; Harry J. Gwinnell

[57] ABSTRACT

The present invention relates to polyester-platelet particle composite compositions comprising about 0.01 to about 25 weight percent platelet particles dispersed in at least one polyester wherein said composition has an I.V. of greater than about 0.55 dl/g, low shear melt viscosity greater than about 30,000 poise and a gas permeability which is at least 10% lower than that of unmodified polyester and processes for producing same.

23 Claims, 1 Drawing Sheet

HIGH I.V. POLYESTER COMPOSITIONS CONTAINING PLATELET PARTICLES

RELATED APPLICATIONS

This application claims the benefit of provisional application US Ser. No. 60/053,573 filed on Jul. 21, 1997 and U.S. Ser. No. 60/034,134, filed Dec. 31, 1996.

BACKGROUND OF THE INVENTION

Polyesters such as poly(ethylene terephthalate) (PET) are widely used in bottles and containers which are used for carbonated beverages, fruit juices, and certain foods. Useful polyesters have high inherent viscosities ("I.V.") which allow the polyester to be formed into a parison or preform and subsequently molded into a container. Because of the limited barrier properties with regard to oxygen, carbon dioxide and the like, PET containers are not generally used for products requiring a shelf life of greater than about 10 to 25 weeks. For example, oxygen transmission into PET bottles which contain beer, wine and certain food products cause these products to spoil.

It would therefore be desirable to provide improved barrier properties while retaining the I.V. necessary to form good containers from polyesters.

There are many examples in the patent literature of polyamide nanocomposites containing, for example, nylon-6 and alkyl ammonium treated montmorillonite. Some patents describe the blending of up to 60 weight percent of intercalated clay materials with a wide range of polymers including polyamides, polyesters, polyurethanes, polycarbonates, polyolefins, vinyl polymers, thermosetting resins and the like. Such high loadings with modified clays are impractical and useless with most polymers because the melt viscosity of the blends increases so much that they cannot be molded. This is especially true with polyesters. Also, clays tend to absorb large quantities of water and attempts to blend them with preformed polyesters at elevated temperatures cause severe degradation of the molecular weight of the polyester.

The following references disclose various chemically modified organoclay materials: U.S. Pat. Nos. 4,472,538; 4,546,126; 4,676,929; 4,739,007; 4,777,206; 4,810,734; 4,889,885; 4,894,411; 5,091,462; 5,102,948; 5,153,062; 5,164,440; 5,164,460; 5,248,720; 5,382,650; 5,385,776; 5,414,042; 5,552,469; WO Pat. Application Nos. 93/04117; 93/04118; 93/11190; 94/11430; 95/06090; 95/14733;

D. J. Greenland, J. Colloid Sci. 18, 647 (1963); Y. Sugahara et al., J. Ceramic Society of Japan 100, 413 (1992); P. B. Messersmith et al., J. Polymer Sci.: Polymer Chem., 33, 1047 (1995); C. O. Sriakhi et al., J. Mater. Chem. 6, 103(1996).

WO 93/04117 discloses a wide range of polymers melt blended with up to 60 weight percent of platelet particles derived from certain organoclays. Although use of polyesters is disclosed, specific polyester/platelet compositions of any molecular weight are not disclosed. WO 93/11190 describes similar polymer blends. All examples include polyamides as a polymer component.

WO 93/04118 discloses composite material of a melt processable polymer and up to 60 weight percent of platelet particles derived from organoclays. Among a wide range of thermoplastic polymers, polyesters are listed as operable. Example 6 shows the melt compounding of PET and Claytone APA (a commercial organomontmorillonite from Southern Clay Products) in a twin screw extruder to prepare a PET composite containing 0.38 weight percent platelet particles. This composite has been found to have a relatively low melt viscosity of about 5,000–12,000. There is no disclosure which would suggest how to increase the melt viscosity of the materials disclosed.

JP Kokai No. 9-176461 discloses polyester bottles wherein the polyester contains swellable laminar silicate. WO 97/31057 discloses polymer composites having dispersed therein inorganic material such as clay which is separated with an inorganic intercalant. WO 97\31973 discloses producing a composite material by mixing an organic polymer with a potassium ionomer in which the ethylene methacrylate copolymer is either partially or completely neutralized with an organic polymer. However, the foregoing references produce materials comprising very large aggregates and tactoids and little if any dispersion of individual platelet particles. Nor do any of the references disclose nanocomposite compositions having other desirable properties such as high melt strength, viscoity and I.V.

U.S. Pat. No. 5,552,469 describes the preparation of intercalates derived from certain clays and water soluble polymers such as polyvinyl pyrrolidone, polyvinyl alcohol, and polyacrylic acid. Although the specification describes a wide range of thermoplastic resins including polyesters and rubbers which can be used in blends with these intercalates, there are no examples teaching how to make such blends.

U.S. Pat. No. 4,889,885 describes the polymerization of various vinyl monomers such as methyl methacrylate and isoprene in the presence of sodium montmorillonite. In Example 11, it describes the polycondensation of dimethyl terephthalate and ethylene glycol in the presence of 33 weight percent of a montmorillonite clay in water (actually 6.2 weight % clay in the final composite). Such large amounts of clay cause quite large increases in melt viscosity and such melt phase PET samples prepared in this manner have I.V.s which are less than about 0.5 dl/g. Such low I.V. polymer would not be useful in preparing bottles.

U.S. Pat. No. 4,163,002 discloses a process for solid state polymerization of polyalkylene terepthalates fortified with 2 to 80 wt % of a filler. The preparation of compositions comprising platelet particles or of any particles with dimensions less than 1000 nm is not disclosed.

DESCRIPTION OF THE INVENTION

This invention relates to new polyester compositions, processes to prepare the new polyester compositions and molded articles from the new polyester compositions. More specifically, this invention relates to compositions comprising about 0.01 to about 25 weight percent platelet particles dispersed in at least one polyester wherein said composition has an I.V. greater than about 0.55 dL/g, a low shear melt viscosity greater than about 25,000 poise and a gas permeability which is at least 10% lower than that of unmodified polyester.

The present invention further relates to a process for preparing a high I.V. polymer comprising the step of solid stating a platelet particle-polyester composite composition comprising about 0.01 to about 25 weight % platelet particles dispersed in at least one polyester under conditions sufficient to increase said I.V. and produce a platelet particle-polyester composite composition having an I.V. of greater than about 0.55 dL/g and a low shear melt viscosity of greater than about 25,000 poise. The solid state polymerization process of this invention permints attainment of the novel, high I.V. and melt viscosity polyester-platelet particle composites. It was particularly surprising that solid stating could be used to increase the I.V. of polyester compositions containing significant amounts of platelet particles. The barrier properties of a variety of polymers, including polyesters, increase as the concentration of platelet particles increase. As barrier properties increase, gas diffusion rates through the polymer decrease. Thus, it was unexpected that sufficient glycol could diffuse out of the polyester-platelet compositions to allow for the amount of solid state polymerization necessary to provide polymers with the desired I.V. It was further surprising that the solid stating could be conducted in a reasonable amount of time. Moreover, even though the platelet particles release water, and the dispersing aids are unstable at typical solid stating temperatures, significant degradation of the polyester material was not observed as a result of solid stating.

The high molecular weight polyester-platelet compositions of this invention are useful for the manufacture of various articles which require high I.V. such as molded objects including beverage bottles and food containers and are useful for the manufacture of sheets and film.

The various components of the present invention are disclosed in detail, below.

Platelet Particles

The compositions of the present invention comprise between about 0.01 and about 25 wt %, preferably between 0.5 and 25 wt %, more preferably between 0.5 and 15 wt % and most preferably between 0.5 and 10 wt % of certain platelet particles derived from organic and inorganic clay materials. The amount of platelet particles is determined by measuring the amount of ash of the polyester-platelet compositions when treated in accordance with ASTM D5630-94, which is incorporated herein by reference.

The platelet particles of the present invention have a thickness of less than about 2 nm and a diameter in the range of about 10 to about 1000 nm. For the purposes of this invention measurements refer only to the platelet particle and not to any dispersing aids or pretreatment compounds which might be used. Suitable platelet particles are derived from clay materials which are free flowing powders having a cation exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonites, nontronite, beidellite, volkonskoite, saponite, sauconite, magadiite, kenyaite, synthetic sodium hecotorites, and the like. Clays of this nature are available from various companies including Southern Clay Products, Kunimine Ind. Co. and Nanocor, Inc. Generally the clay materials are a dense agglomeration of platelet particles which are closely stacked together like cards.

Other non-clay materials having the above described ion exchange capacity and size, such as chalcogens may also be used as the source of platelet particles under the present invention. These materials are known in the art and need not be described in detail here.

The prior art has defined the degree of separation of the platelet particles based on peak intensity and basal spacing, or lack thereof, as determined by X-ray analyses of polymer-platelet composites. However, in polyester composites X-ray analysis alone does not accurately predict the dispersion of the platelet particles in the polyester nor the resultant barrier improvement. TEM images of polyester-platelet composites show that platelet particles which are incorporated into at least one polyester exist in a variety of forms, including, but not limited to invdividual platelets (the exfoliated state), disordered agglomerates of platelets, well ordered or stacked aggregates of platelets (tactoids) and aggregates of tactoids. X-ray analysis only provides information related to the well ordered aggregates, which are only a small portion of the platelet particles which are present.

Without being bound by any particular theory, it is believed that the degree of improved barrier depends upon the aspect ratio of the resulting particle platelets and aggregates, the degree to which they are dispersed or uniformly distributed and the degree to which they are ordered perpendicular to the flux of the permeant. To obtain the improvements in gas permeability and the enhanced melt visocity disclosed in the present invention it is necessary that the platelet particles be dispersed in the polyester such that the majority, preferably at least about 75% and perhaps as much as at least about 90% or more of the platelet particles have a thickness in the shortest dimension of less than about 20 mn and preferably less than about 10 mn as estimated from TEM images representative of the bulk of the composite. Polyester-platelet composites containing more individual platelets and fewer aggregates, ordered or disordered are most preferred. Dispersions containing a high level of individual platelet particles have not been previously disclosed. Previous patents and applications have claimed to produce polyesters containing intercalated or exfoliated platelet particles, as indicated by large basal spacings or the lack of a detectable basal spacing by X-ray, however, the results could not be reproduced. With the exception of WO 93/04118 (which does not posses suitable I.V. and melt viscosity), the polyester/platelet compositions of the prior art are believed to be dispersions of aggregates with large thickness, typically greater than about 20 nm. While the aggregates were well spaced, very few individual platelets and tactoids or particles with thicknesses less than about 20 nm could be found. Without achieving a good dispersion and small particle size improved barrier and visual properties cannot be achieved.

Improvements in gas barrier also increase as the amount of platelet particles in the polyester increases. While amounts of platelet particles as low as 0.01% provide improved barrier (especially when well dispersed and ordered), compositions having at least about 0.5 wt % of the platelet particles are preferred because they display the desired improvements in gas permeability.

Generally, it is desirable to treat the selected clay material to separate the agglomerates of platelet particles to individual platelet particles and small tactoids prior to introducing the platelet particles to the polyester. Separating the platelet particles prior to incorporation into the polyester also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations. Examples of useful pretreatment with polymers and oligomers include those disclosed in U.S. Pat. Nos. 5,552,469 and 5,578,672, incorporated herein by reference.

Examples of useful polymers for intercalating the platelet particles include polyvinyl pyrrolidone, polyvinyl alcohol, polyethylene glycol, polytetrahydrofuran, polystyrene, polycaprolactone, certain water dispersable polyesters, Nylon-6 and the like.

Examples of useful pretreatment with organic reagents and monomers include those disclosed in EP 780,340 A1, incorporated herein by reference. Examples of useful organic reagents and monomers for intercalating the platelet particles include dodecylpyrrolidone, caprolactone, aprolactam, ethylene carbonate, ethylene glycol, bishydroxyethyl terephthalate, dimethyl terephthalate, and the like or mixtures thereof.

Examples of useful pretreatment with silane compounds include those treatements disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3 -trimethoxysilylpropyl) ammonium chloride and the like.

Numerous methods to modify layered particles with organic cations are known, and any of these may be used in the process of this invention. One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amount of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than micron in diameter. The process to modify layered particles with organic cations may be conducted in a batch, semi-batch or continuous manner.

Useful organic cation salts for the process of this invention can be represented as follows:

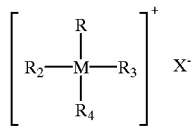

Wherein M represents either nitrogen or phosphorous; X represents an anion selected from the group consisting of halogen, hydroxide, or acetate anions, preferably chloride and bromide; $R_1$, $R_2$, $R_3$ and $R_4$ are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like or mixtures thereof, and alkyl phosphonium ions such as tetrabutyl phosphonium, trioctyl octadecyl phosphonium, tetraoctyl phosphonium, octadecyl triphenyl phosphonium, and the like or mixtures thereof. Illustrative examples of suitable polyalkoxylated ammonium compounds include those available under the trade name Ethoquad or Ethomeen from Akzo Chemie America, namely, Ethoquad 18/25 which is octadecyl methyl bis(polyoxyethylene[15]) ammonium chloride and Ethomeen 18/25 which is octadecyl bis (polyoxyethylene[15])amine, wherein the numbers in brackets refer to the total number of ethylene oxide units. The most preferred organic cation is octadecyl methyl bis (polyoxyethylene[15]) ammonium chloride.

If desired, the treated or untreated platelet particles may be further separated into a dispersing medium prior to or during contact with polyester monomers. Many such dispersing aids are known, covering a wide range of materials including water, alcohols, ketones, aldehydes, chlorinated solvents, hydrocarbon solvents, aromatic solvents, and the like or combinations thereof. One especially useful embodiment is exfoliation or dispersion of treated or untreated platelet particles into ethylene glycol with the addition of one or more of the above swelling aids or intercalating compounds. The particles are dispersed as individual platelet particles and tactoids. The ethylene glycol/platelet particle blends are usually high viscosity gels at zero shear, but they undergo shear thinning and flow under shear stresses caused by stirring and pumping. Other examples of predispersion of modified or unmodified particles include, but are not limited to, those disclosed in EP 747,451 A2 and U.S. Pat. No. 4,889,885, which are incorporated herein by reference.

It should be appreciated that on a total composition basis, dispersing aids and/or pretreatment compounds which are used may account for a significant amount of the total composition, in some cases up to about 30 weight %. While it is preferred to use as little dispersing aid/pretreatment compounds as possible, the amounts of dispersing aids and/or pretreatment compounds may be as much as about 8 times the amount of the platelet particles. Polyesters The polyester component of the compound of the present invention is present in amounts up to about 99.99 wt %, preferably from about 50 to about 99.99 weight %, more preferably from about 75 wt % to about 99.5% and most preferably 99.5% to about 85%. Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from one or more of the above dicarboxylic acids.

Typical glycols used in the polyester include aliphatic glycols containing from two to about ten carbon atoms, aromatic glycols containing from 6 to 15 carbon atoms and cycloaliphatic glycols containing 7 to 14 carbon atoms. Preferred glycols include ethylene glycol, 1,4-butanediol, 1,6-hexanediol, 1,4-cyclohexanedimethanol, diethylene glycol and the like. Resourcinol and hydroquinone are preferred glycols for producing fully aromatic polyesters. The glycol component may optionally be modified with up to about 50 mole percent, preferably up to about 25 mole % and most preferably up to about 15 mole % of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may be prepared from one or more of the above diols.

Difunctional components such as hydroxybenzoic acid may also be used. Also small amounts of multifinctional polyols such as trimethylolpropane, pentaerythritol, glycerol and the like may be used if desired. When using 1,4-cyclohexanedimethanol, it may be the cis, trans or cis/trans mixtures.

The resin may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, acetaldehyde reducing compounds and the like.

The polyester/dispersed platelet compositions should be crystallizable to an extent that is sufficient to prevent sticking during solid stating. The polyesters of the present invention may be made by any process which is known in the art. Typically polyesters are made via well known polycondensation processes.

In the present invention, the platelet particles may be added to the polyester at any time prior to solid stating, such as during melt phase polymerization or after polymerization but prior to solid stating.

Inherent Viscosity

In general, commercial melt phase polycondensation processes produce polyesters with low shear melt viscosities of about 3,000 poise, and are limited to the production of polymers with low shear melt viscosities less than 10,000 poise. As used here low shear means about than 1 radian/sec. Due to increasing melt viscosity, in general, polyesters, such as unmodified PET, prepared by conventional melt phase polycondensation processes are limited to I.V.'s of about 0.3 to about 0.7 dL/g, more typically about 0.4 to about 0.6 dL/g. Inherent viscosity (I.V.) is measured at 25° C. at a concentration of 0.5 g/dL in a 60/40 weight percent mixture of phenol/tetrachloroethane.

Because the presence of exfoliated clay increases melt viscosity, melt polymerized polyesters containing as little as 0.01 weight % platelet particles and certainly those containing greater than about 0.5 weight percent platelet particles display I.V.'s which are lower than those achievable in unmodified PET.

Further, as the level of platelet particles increases due to increased clay loading or improved delamination of the clay, the melt viscosity increases, decreasing the maximum attainable I.V. from melt polymerization. If little delamination occurs, then little increase in melt viscosity is observed. However, delamination to a thickness of about 20 nm or less results in dramatic increase in melt viscosity. Even with the use of laboratory scale melt-phase reactors which are capable of prepaing high I.V. unmodified PET (up to about 1.0 dL/g), melt preparation of a PET composite containing exfoliated platelet particles and having both a low shear melt viscosity greater than 30,000 poise and an I.V. greater than about 0.55 dL/g is very difficult due to inability to stir the melt and low reactivity caused by poor diffusion of the condensate out of the melt with increasing I.V. In glass laboratory equipment high I.V. and high low shear melt viscosity can be obtained by continuing to heat the melt. However, the product can only be isolated by breaking the glass. This is not feasible for a commercial process.

Melt blending of PET with greater than about 2.0 weight percent clay materials causes significant degradation in molecular weight. The degradation of the PET is so severe that it cannot be overcome by increasing the molecular weight of the PET prior to compounding. Bottles made from such low molecular weight material would have extremely poor properties. Also with the nucleating effect of the clay, the rapid crystallization of a preform made from such a blend would prevent the successful blowing of a bottle from it. Conversely, the addition of clay in amounts less than about 2 weight % generally does not yield the desired increase in melt viscosity.

We have surprisingly found that by solid state polymerizing polyester/platelet compositions, I.V. values greater than about 0.5 and preferably between about 0.6 and about 1.2 dL/g may readily be achieved from precursor polyester 1.5 nanocomposites which have I.V.s of less than 0.5 and less than 0.6 dL/g respectively. Moreover, because of the improved barrier properties, it was surprising to find that conventional solid stating techniques are capable of providing the desired I.V. in a reasonable amount of time without polymer degradation.

Solid State Polymerization

A further embodiment of this invention relates to processes to prepare the novel polyester compositions by use of solid state polymerization. The process of this invention relates to solid state polymerization of a precursor polyester composite with I.V. of at least 0.1 dL/g to an I.V. of at least about 0.55 dL/g. Solid state polymerization involves heating a granulated or pelletized precursor polymer at a temperature between the glass transition temperature and the melting point temperature of the polymers thereby increasing the polymer's I.V. Any granule or pellet size and shape may be used. Various solid stating processes are known in the art. Examples include, but are not limited to, those disclosed in U.S. Pat. Nos. 4,064,112 and 4,161,578, which are incorporated herein by reference.

It was surprising to find that commercially desirable molecular weights could be achieved in the presence of the platelet particles because dispersed platelet particles decrease gas diffusion rates through the material, which should theoretically make solid stating more difficult. Moreover, the introduction of water and various organic moieties into the polyester with the platelets was expected to degrade the properties of polyester during solid stating. Surprisingly, significant degradation was not observed.

However, it should be appreciated that as the amount of platelet particles dispersed in the polyester increases, the solid stating time to achieve the same I.V. increase will also increase. Therefore, there is a practical upper limit of dispersed platelet particles of about 25 wt %. The I.V. of the polyester/platelet precursor prior to solid state polymerization may be as low as about 0.1 dL/g or as high as 0.7 dL/g, depending on amount of platelet particles added and the capability of the melt phase reactor which is used. Preferably the I.V. of the precursor is between about 0.2 and about 0.6 dL/g and more preferably between about 0.2 and about 0.5 dL/g.

Thus, solid state polymerization is a convenient process to obtain high molecular weight polyester composites that eliminates the need to build up the precursor material to maximum I.V. by melt-phase polymerization. This provides a great deal of flexibility in the production process and allows reduction of the melt phase reaction time to achieve advantages such as reduced melt viscosity of the composite composition to a range that may be handled by typical melt phase reactors. The present invention also reduces thermal degradation of the polyester caused by reagents used to pretreat the layered particles, thereby improving the color of the composite.

Suitable solid stating times will vary based upon several factors including the amount of platelet particles dispersed in the polyester, the size and geometry of the platelet particle-polyester composite pellets, the initial I.V. and the desired final I.V. Generally, suitable solid stating times are greater than about 8 hours, and more preferably greater than about 12 hours.

Suitable catalyst or catalyst mixtures may be incorporated into the polymer during melt phase polymerization to decrease solid stating time. A wide range of metal based catalysts may be used, and may include catalysts based on titanium, manganese, antimony, cobalt, germanium, tin, zinc, calcium and the like or mixtures of thereof.

Because of the extended reaction time, the solid state polymerization is preferably performed in an inert atmosphere. Further, because it is necessary to remove the ethylene glycol, a dynamic inert gas atmosphere or vacuum is preferred. Inert gas is any gas which does not react or cause the absorption of water into the polyester pellets. Suitable gases include, but are not limited to partially or fully dehumidified air, argon and nitrogen.

Any solid state polymerization reactor may be used, and this process may be conducted either batchwise or in a continuous manner.

The precursor polyester may be prepared by any method, provided that the precursor is active towards solid state polymerization, such that an increase in I.V. is observed.

In one embodiment of this invention a precursor polyester-platelet composite material is formed by a melt polymerization process which may be carried out in a batch, semi-continuous or continuous mode of operation, during which the platelet particles are introduced. The polymerization conditions of time, temperature and pressure may vary substantially depending upon factors including the choice of clay materials, treatment of the clay materials to separate the platelet particles, choice of polyester monomers, choice of catalyst, amount of catalyst, I.V. desired and type of reactor used. Polyester polymerziations typically require catalysts and a wide range of metal based catalysts are known and suitable in the present invention. These catalysts include, but are not limited to, catalysts based on titanium, manganese, magnesium, zinc, antimony, cobalt, germanium, tin, lithiumm aluminum and the like and mixtures thereof. There are many melt polymerization processes known to produce polyesters, and optimum conditions for melt polymerization depends upon many process variables which are well known to those skilled in the art. The platelet particles may be added to the monomers or added directly, optionally with a carrier or dispersing aid, prior to or any time during the melt polymerization process.

In another embodiment of this invention, the precursor material is prepared by (1) exfoliating the layered particles into ethylene glycol optionally with the addition of a swelling aid, (2) adding dimethyl terephthalate or terephthalic acid and catalysts, and (3) conducting melt phase polymerization. The resulting nanocomposite contains exfoliated layered particles in a PET matrix comprising a small amount of diethylene glycol units.

In another embodiment of the present invention the precursor material is formed by a melt compounding extrusion process during which the treated or untreated platelet particles are introduced into a polyester. Prior to compounding, the platelet particles may exist in various forms including pellets, flakes, chips and powder. It is preferred that the platelet particles be reduced in size by methods known in the art, such as hammer milling and jet milling. Prior to compounding, the polyester may exist in wide variety of forms including pellets, ground chips, powder and molten. In one embodiment of this invention, the precursor material is prepared by (1) dry mixing polyester with platelet particles then (2) passing the mixture through a compounding extruder under conditions sufficient to melt the polyester.

In yet another embodiment of this invention, the polyester and treated or untreated platelet particles are fed separately into a compounding extruder. When treated platelet particles are used in this process, it is preferred that the polyester be added first to minimize degradation of the treated layered particles.

A further embodiment of this invention relates to articles prepared from the new compositions, including films, tubes, pipes, containers and the like, but especially stretch blow molded and extrusion blow molded containers and films.

In stretch blow molded containers the inclusion of dispersed platelet particles causes a nucleating effect which causes rapid crystallization of polyester. Due to the rapid crystallization, blow molding preforms by conventional single stage or two stage blow molding processes is quite difficult. Such methods require the heating the preforms to a temperature between about 10 to 50° C. higher than the glass transition (Tg) value of the polymer and then blow molding them to the desired shape. In the case of unmodified PET polymers, useful reheat temperatures are between about 90 to about 180° C. with about 100 to about 120° C. being preferred.

In the single stage process, the preform is cooled after molding to the desired temperature and blown into a container. In the two stage process, the preform is cooled to ambient temperature, subsequently heated to a temperature which exceeds its Tg and blown into a container. Due to the crystallization behavior, the single stage process is preferred over the two stage process, although it was surprising that containers with good properties could be blown from the latter. As with neat (clay-free) polyesters, containers and films prepared from the new compositions could be heatset by methods familiar to those skilled in the art without degrading the optical, physical, chemical, or mechanical properties of the articles.

The bottles and containers of this invention provide increased shelf storage life for contents, including beverages and food, that are sensitive to the permeation of gases.

In extrusion blow molded containers, a molten parison is extruded and is clamped by a container mold. Air is injected into the parison and the container is formed. Typical blowing temperatures for the parison are about 10° C. below the melting temperature of the polyester to about 25° C. above the melting temperature. In the case of PET polymers, useful parison blowing temperatures fall within the range of 240° C. to 275° C.

Containers of the present invention display gas permeabilities (oxygen, carbon dioxide, water vapor) 15% to 90% lower (depending on platelet particle concentration) than that of similar containers made from neat (clay-free) polyester, resulting in correspondingly longer product shelf life provided by the container. Desirable sidewall modulus and tensile strengths may also be maintained.

The following examples will further illustrate the invention.

EXAMPLES

Comparative Examples 1–4

Varying amounts of Claytone APA (alkylammonium modified montmorillonite purchased from Southern Clay Products) were dry mixed with PET-9921 (Eastman Chemical Company, I.V. of about 0.72 dL/g, PET containing about 3.5 mole percent 1,4-cyclohexane dimethanol and about 1.5 mole percent diethylene glycol). The mixture was dried in a vacuum oven overnight at 120° C. then extruded at a melt temperature of 280° C. on a Leistritz Micro 18 mm twin screw extruder using general purpose screws and vacuum ventilation. The extrudate was quenched in water and chopped into pellets as it exited the die. As shown in Table 1 and FIG. 1, the I.V. of the polyester-platelet particle composites decreases as the amount of platelet particles incorporated increases. TEM imaging of these polyester-platelet composites show the presence of mostly organized tactoids with thickness less than about 50 nm, some larger aggregates, and few if any individual platelets. Thus, the I.V. of each of these compounded composites dropped between 0.04 and over 0.26 dL/g from the I.V. of the base PET used. Comparative Examples 1–4 clearly illustrate the significant I.V. degradation observed when layered particles are melt compounded into polyesters. Also, at low platelet particle concentrations for which I.V.s less than about 0.55 dL/g are maintained, the low shear melt viscosity improvement is not observed.

Comparative Examples 5–8

The procedure of Comparative Examples 1–4 was followed except that the polyester used was PET-13339 (Eastman Chemical Company, I.V. of about 0.98 dL/g and containing about 3.5 mole percent 1,4-cyclohexane dimethanol, about 1.5 mole percent diethylene glycol). As shown in Table 1 and FIG. 1, these polyester-platelet particle composites also showed significantly decreased I.V. compared to unmodified PET. TEM imaging of these polyester-platelet particle composites show mostly organized tactoids with thickness less than about 50 nm, some larger aggregates, and few if any individual platelets. Clearly the I.V. degradation observed for melt compounding polyesters with organocation modified layered particles cannot be overcome by increasing the I.V. of the initial polyester. Again, none of the samples show both an I.V. greater than 0.55 and a melt viscosity of greater than 30,000 poise.

TABLE 1

| Comparative Example | PET I.V. (dL/g) | Ash (wt %) | I.V. (dL/g) | Low Shear Melt Viscosity ($10^3$ P) |
|---|---|---|---|---|
| 1 | 0.72 | 0.36 | 0.68 | 4.9 |
| 2 | 0.72 | 1.8 | 0.62 | 3.5 |
| 3 | 0.72 | 4.7 | 0.53 | 40.9 |
| 4 | 0.72 | 6.7 | 0.48 | 92.2 |
| 5 | 0.98 | 0.31 | 0.77 | 12.2 |
| 6 | 0.98 | 1.8 | 0.65 | 4.6 |
| 7 | 0.98 | 4.3 | 0.57 | 19.2 |
| 8 | 0.98 | 6.8 | 0.50 | 109 |

Example 1

72.0 grams (68.4 meq) of sodium montmorillonite (supplied by Southern Clay Products and reported to have a cation exchange capacity of 95 milliequivalents/100 grams) and 3600 ml of water at 60° C. were blended in a Henschel mixer for two minutes at about 1500 rpm. 73.7 g (75.2 meq) of octadecylmethyl-[ethoxylated(15)] ammonium chloride (commercially available as Ethoquad 18/25) in 360 ml of water were added to the mixer and blended for two minutes. The solids were then removed by filtration with a Buchner funnel with flitted disk. The wet solids were then slurried in 400 ml of water in a Vitamix Blender and filtered. The filtercake was dried at 60° C. in an oven for 16 hours to provide 59 grams of a light tan solid. Analysis by X-ray diffraction showed a basal spacing of 3.28 nm. Ash residue, which is a measure of the inorganic content, was 51 weight percent. The material was passed through a hammer mill then a jet mill to reduce the number average particle size to about 10 microns.

115 g of oligo(ethylene terephthalate) (number average molecular weight of 377 g/mole), 3.96 g of 1,4-cyclohexane dimethanol, and 2.67 g of the above organocation modified layered particle were charged to a single-neck, 1-L round-bottom flask. The appropriate amounts of metal catalyst solutions were added to provide 20 ppm titanium, 40 ppm phosphorus, 80 ppm cobalt, and 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 standard cubic feet per hour (scfh). A metal bath, which was preheated to 220° C., was raised until it covered the flask. After the solid monomers melted, stirring at 150 rotations per minute (rpm) was begun. The temperature was held at 220° C. for 15 minutes to allow the 1,4-cyclohexane dimethanol to react. The metal bath temperature was increased to 280° C. over a period of about 15 minutes. With stirring at 150 rpm at 280° C., vacuum of less than 0.3 torr was applied to the melt gradually over a period of 15 minutes to prevent foaming. Vacuum of less than 0.3 torr, temperature of 280° C., stirring at 150 rpm was maintained for 15 minutes, during which time ethylene glycol condensate collected in a receiving flask and the viscosity of the melt increased. Then, the metal bath was lowered, the vacuum was released with nitrogen, stirring was stopped, and the composite cools to a semicrystalline solid. The composite was released from the glass flask by melting the outer edges of the polymer by immersing the flask into the metal bath, which was preheated to 290° C., and applying enough torque on the stirring rod to allow the composite to release from the flask wall. After cooling to room temperature, the flask was broken, and the composite was then broken from the stirrer using a hydraulic cutter. The composite pieces were ground to pass a 4 mm mesh screen then fine particles were removed using a 0.85 mm mesh screen to give about 160 g of a polyester-platelet particle precursor material. Analytical analyses showed the composite material had an IV value of 0.31 dL/g, low shear melt viscosity at 280° C. of 87.3×10$^3$ P, and the following glycol residues based on 100 mole percent total glycol residues: 11 mole percent diethylene glycol, 4 mole percent 1,4-cyclohexane dimethanol, and 85 mole percent ethylene glycol.

The above polyester-platelet composite material was dried overnight in a vacuum oven at 120° C. with a slight nitrogen purge. The dried material was placed into a glass solid state polymerization unit with a nitrogen purge of 14 scfh and heated by boiling diethyl succinate which has a boiling point of 218° C. After a period of 16 hours, heating was discontinued and the solid state polymerization unit was allowed to cool. After cooling, the composite material was removed.

Analytical results showed that the composite had an IV value of 0.70 dL/g, a low shear melt viscosity at 280° C. of 261×10$^3$ P, an ash residue of 5.6 weight percent, a glass transition temperature of 64° C., and a melting point of about 239° C. TEM imaging of this polyester-platelet composite shows the presence of mostly individual platelets and few tactoids and aggregates. Thus, solid stating according to the present invention clearly provided significantly improved I.V. and good low shear melt viscosity.

The above polyester-platelet composite was dried overnight in a vacuum oven at 120° C. with a slight nitrogen purge. The dried material was compression molded at 280° C. then quenched in ice-water to provide a clear film with thickness of about 10 mil. Testing conducted on the film showed the oxygen permeability was 2.5 cc-mil/100 in$^2$-24 hr-atm, the Young's modulus was 2.3 GPa, and the tensile strength was 49 MPa. Thus, the polyester-particle composite has significantly improved barrier and tensile properties.

Examples 2–5

The procedure of Example 1 was repeated except the amounts of platelet particles and the times allowed for solid state polymerization were changed as set forth in Table 2. Table 2 also presents the results of the analyses of the polyester-platelet particle composites.

Examples 6–8

The procedure of Examples 2–5 was repeated except that the organic salt used was bis(2-hydroxyethyl)methyl tallow ammonium chloride (Ethoquad T/12).

The organocation modified platelet particle exhibited a basal spacing by X-ray diffraction of 1.80 nm and an ash residue of 66 weight percent. Table 2 presents the results of the analyses of the polyester-platelet particle composites. TEM imaging of the final polyester-platelet particle composites shows the presence of significant amounts of individual platelets and tactoids with thickness of less than about 10 nm, along with a few large tactoids and aggregates.

Example 9–11

The procedure of Examples 2–5 was repeated, except that the organic salt used was 12-aminododecanoic acid which was converted to the organic salt by addition of hydrochloric acid. The organocation modified platelet particle exhibited a basal spacing by X-ray diffraction of 1.66 nm and an ash residue of 78 weight percent. Table 2 presents the results of the analyses of the polyester-particle composites. TEM imaging of the final polyester-platelet composites shows the presence of significant amounts of individual platelets and tactoids with thickness of less than about 10 nm, along with a few large tactoids and aggregates.

Example 12

The procedure of Example 1 was repeated, except that the clay used was Kanunpia-F, which was a commercial sodium montmorillonite from Kunimine Ind. Co. and was reported to have a cation exchange capacity of 119 milliequivalents per 100 grams. The organocation modified platelet particle exhibited a basal spacing by X-ray diffraction of 3.23 nm and an ash residue of 49 weight percent. Table 2 presents the results of the analyses of the polyester-particle composite. TEM imaging of this polyester-platelet composite shows the presence of mostly individual platelets and few tactoids and aggregates.

Examples 13–15

The procedure of Examples 2–5 was repeated, except that the organic salt used was Claytone APA, which is a commercial organomontmorillonite available from Southern Clay Products. Table 2 presents the results of the analyses of the polyester-platelet particle composites. TEM imaging of these polyester-platelet particle composites show the presence of mostly organized tactoids with thickness less than about 50 nm, some larger aggregates, and few if any individual platelets.

TABLE 2

| | | Melt Phase Polymerization | | Solid State Polymerization | | | |
| --- | --- | --- | --- | --- | --- | --- | --- |
| Example | Ash (wt %) | I.V. (dL/g) | Low Shear Melt Viscosity @ 280° C. (10$^3$P) | Solid State Polymerization Time (hr) | I.V. (dL/g) | Low Shear Melt Viscosity @ 280° C. (10$^3$P) | Film Oxygen Permeability (cc-mil/100 in$^2$-day-atm) |
| 1 | 5.6 | 0.31 | 81 | 16 | 0.70 | 261 | 2.5 |
| 2 | 0.25 | 0.24 | 0.04 | 24 | 0.85 | 19.9 | |

TABLE 2-continued

| | | | Melt Phase Polymerization | | Solid State Polymerization | | |
|---|---|---|---|---|---|---|---|
| Example | Ash (wt %) | I.V. (dL/g) | Low Shear Melt Viscosity @ 280° C. (10³P) | Solid State Polymerization Time (hr) | I.V. (dL/g) | Low Shear Melt Viscosity @ 280° C. (10³P) | Film Oxygen Permeability (cc-mil/100 in²-day-atm) |
| 3 | 2.2 | 0.48 | 5.0 | 4 | 0.71 | 43.4 | 6.8 |
| 4 | 5.5 | 0.34 | 93 | 16 | 0.68 | 245 | 3.4 |
| 5 | 8.9 | 0.26 | 98 | 24 | 0.51 | 342 | 1.3 |
| 6 | 2.4 | 0.45 | 2.3 | 8 | 0.73 | 28.9 | 7.9 |
| 7 | 5.9 | 0.40 | 67 | 8 | 0.67 | 131 | 5.6 |
| 8 | 9.2 | 0.32 | 139 | 8 | 0.59 | 146 | 3.0 |
| 9 | 2.4 | 0.46 | | 4 | 0.86 | | 9.7 |
| 10 | 5.7 | 0.44 | | 8 | 1.03 | | 8.3 |
| 11 | 8.7 | 0.39 | | 23 | 0.99 | | 7.1 |
| 12 | 5.8 | 0.35 | | 23 | 0.69 | | 3.7 |
| 13 | 1.9 | 0.42 | 0.8 | 8 | 0.74 | 18.2 | 10.1 |
| 14 | 5.4 | 0.40 | 19 | 8 | 0.59 | 33.8 | 8.2 |
| 15 | 8.2 | 0.28 | 20 | 8 | 0.50 | 36.9 | 7.8 |

The data in Table 2 clearly shows that the process of the present invention is applicable to a wide variety of clays, treatments with ammonium cations and clay concentrations.

Comparative Example 9

Examples 1 was followed except that no particles, treated or untreated, was used. After the melt phase polymerization the polyester had an IV of 0.20 dL/g, a melt viscosity of less than 10 poise, and glycol residue composition of 2 mole percent diethylene glycol, 4 mole percent 1,4-cyclohexane dimethanol, and 94 mole percent ethylene glycol. After solid state polymerization, the polyester had an IV of 0.68 dL/g and a melt viscosity at 280° C. of $3.1 \times 10^3$ P.

Film prepared from the above clay-free material had an oxygen permeability value of 11.6 cc-mil/100 in²-24 hr atm, Young's modulus of 1.5 GPa, and tensile strength of 50 Mpa.

Example 16

194 g (1.00 mole) of dimethyl terephthalate, 124 g (2.00 moles) of ethylene glycol, and 3.99 g of organocation modified layered particle from Example 1 were charged to a single-neck, 1-L round-bottom flask. The appropriate amounts of metal catalyst solutions were added to provide 20 ppm titanium, 55 ppm manganese, 80 ppm cobalt, and 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 scfh (standard cubic feet per hour). A metal bath, which was preheated to 200° C., was raised until it covers the flask. The temperature of the metal bath decreases to about 180° C. upon immersion of the flask and reheated to 200° C. in about 10 minutes. During this time, the solid monomers melted, and stirring at 400 rpm (rotations per minute) was begun. The temperature was increased to 220° C. over a period of 5 hours, and methanol condensate was collected in a receiving flask. The metal bath temperature was increased to 280° C. over a period of about 20 minutes. The appropriate amount of phosphorus containing solution was added to provide 110 ppm of phosphorus in the final composite. With stirring at 400 rpm at 280° C., vacuum of less than 0.3 torr was applied to the melt gradually over a period of 15 minutes to prevent foaming. Vacuum of less than 0.3 torr and temperature of 280° C. was maintained for 40 minutes, during which time ethylene glycol condensate collected in a receiving flask and the viscosity of the melt increased. The stirring rate was decreased as the melt viscosity increased to prevent the viscous melt from wrapping around the stirrer shaft and pulling away from the flask wall. Then, the metal bath was lowered, the vacuum was released with nitrogen, stirring was stopped, and the composite cooled to a semicrystalline solid. The composite was released from the glass flask by melting the outer edges of the polymer by immersing the flask into the metal bath, which was preheated to 290° C., and applying enough torque on the stirring rod to allow the composite to release from the flask wall. After cooling to room temperature, the flask was broken, and the composite was then broken from the stirrer using a hydraulic cutter. The composite pieces were ground to pass a 6 mm mesh screen then the fines were removed using a 0.85 mm mesh screen to give about 160 g of material. Analytical results showed the polyester-platelet precursor product had I.V. of 0.50 dL/g, ash residue of 1.1 weight percent, glass transition temperature of 76° C., peak melting point of 248° C., low shear melt viscosity at 280° C. of $4.1 \times 10^3$ P, and glycol residue composition of 5 mole percent diethylene glycol and 95 mole percent ethylene glycol.

The above polyester-platelet precursor was dried overnight in a vacuum oven at 110° C. with a slight nitrogen purge. The dried material was placed into a glass solid state polymerization unit with a nitrogen purge of 14 scfh and heated by boiling diethyl succinate which has a boiling point of 218° C. After a period of 8 hours, heating was discontinued and the solid state polymerization unit was allowed to cool. After cooling, the composite material was removed. Analytical results showed that the IV increased to 0.99 dL/g and the low shear melt viscosity at 280° C. increased to $49 \times 10^3$ P. TEM imaging of these polyester-platelet composites show the presence of mostly individual platelets, some aggreagates with thickness less than about 10 nm, and few larger aggregates and tactoids.

The above composite material was dried overnight in a vacuum oven at 110° C. with a slight nitrogen purge. The dried material was compression molded at 280° C. then quenched in ice-water to provide a clear film with thickness of about 10 mil. The oxygen permeability of this film was determined to be 7.2 cc-mil/100 in²-24 hr-atm. This example demonstrates that good I.V., low shear melt viscosity and oxygen permeability are achieved when the organocation modified layered particle up front with dimethyl terephthalate and ethylene glycol and the resultant polyeseter-platelet particle composite is solid stated.

Example 17

The procedure of Example 7 was followed except that the amount of 1,4-cyclohexane dimethanol was increased to provide about 8 mole percent in the final composite. The precursor composite was readily crystallized and had an I.V. of 0.38 dL/g, ash residue of 5.6 weight percent, diethylene glycol content of 9 mole percent, and low shear melt viscosity at 280° C. of 77×10³ P. After solid state polymerization for 8 hours, the composite had I.V. of 0.69 dL/g and low shear melt viscosity at 280° C. of 220×10³ P. TEM imaging of these polyester-platelet composites show the presence of mostly individual platelets, some aggreagates with thickness less than about 10 nm, and few larger aggregates and tactoids. Film prepared from this composite had oxygen permeability of 5.9 cc-mil/100 in²-24 hr-atm, Young's modulus of 2.5 GPa, and tensile strength of 42 MPa.

Example 18

The procedure of Example 17 was followed except that the amount of 1,4-cyclohexane dimethanol was increased to provide 12 mole percent in the final composite. The precursor composite was readily crystallized and had I.V. of 0.37 dL/g, ash residue of 5.8 weight percent, diethylene glycol content of 9 mole percent, and low shear melt viscosity at 280° C. of 100×10³ P. After solid state polymerization for 8 hours, the composite had I.V. of 0.53 dL/g and low shear melt s viscosity at 280° C. of 125×10³ P. TEM imaging of these polyester-platelet composites show the presence of mostly individual platelets, some aggreagates with thickness less than about 10 nm, and few larger aggregates and tactoids. Film prepared from this composite has oxygen permeability of 6.0 cc-mil/100 in²-day-atm, Young's modulus of 2.5 GPa, and tensile strength of 31 MPa.

Example 19

This example illustrates the use of diacids other than terephthalic acid. The procedure of Example 16 was followed except that the appropriate amount of dimethyl napthalate was used instead of dimethyl terephthalate. The final composite had I.V. of 0.96 dL/g, ash residue of 1.3 weight percent, and diethylene glycol content of 12 mole percent. TEM imaging of these polyester-platelet composites show the presence of mostly individual platelets, some aggreagates with thickness less than about 10 nm, and few larger aggregates and tactoids. Film prepared from this composite has oxygen permeability of 2.3 cc-mil/100 in²-day-atm and Young's modulus of 1.70 GPa.

Example 20

The procedure of Examples 19 was followed except that the amount of organocation modified layered particle was increased to about 5 weight percent.

The final composite had I.V. of 0.90 dL/g, ash residue of 2.8 weight percent, and diethylene glycol content of 5 mole percent. TEM imaging of these polyester-platelet composites show the presence of mostly individual platelets, some aggreagates with thickness less than about 10 nm, and few larger aggregates and tactoids. Film prepared from this composite had oxygen permeability of 1.6 cc-mil/100 in²-day-atm and Young's modulus of 2.01 GPa.

Comparative Example 10

The procedure of Example 19 was followed except that no platelet particle was used. The particle-free PEN material had I.V. of 0.96 dL/g and diethylene glycol content of 2 mole percent. Film prepared from this PEN had oxygen permeability of 3.1 cc-mil/100in²-day-atm and Young's modulus of 1.67 GPa.

Example 21

This example illustrates some process variables for the melt phase and solid state polymerization procedures and their effect on product I.V. and diethylene glycol content. The procedure of Example 12 was repeated except that (1) the ammonium used was 12-aminododecanoic acid, hydrochloride, (2) the only catalysts were 65 ppm of zinc and 230 ppm of antimony (no other additives were used), (3) the maximum temperature of the melt phase polymerization was 265° C., which was maintained for 90 minutes, including 20 minutes to achieve full vacuum, (4) the solid state polymerization was conducted in a flask immersed into a heated metal bath using vacuum instead of dynamic nitrogen, and (5) the temperature profile for solid state polymerization was 1 hour at 230° C. and 3.5 hours at 240° C. The precursor had an I.V. value of 0.45 dL/g and an ash residue of 2.5 weight percent. The final composite had an I.V. of 0.65 dL/g, glass transition temperature of 65° C., melting point of 247° C., and diethylene glycol content of 11 mole percent. TEM imaging of these polyester-platelet composites show the presence of mostly individual platelets and aggreagates with thickness less than about 10 nm, and few larger aggregates and tactoids. The oxygen permeability of a 10-mil film of this composite was determined to be 5.6 cc-mil/100 in²-day-atm.

Example 22

The procedure of Example 21 was repeated except that starting platelet particle used was sodium montmorillonite from Southern Clay Products. The final composite had I.V. of 0.60 dL/g, ash residue of 4.4 weight percent, glass transition temperature of 71° C., melting point temperature of 255° C., and diethylene glycol content of 5 mole percent. TEM imaging of these polyester-platelet composites show the presence of mostly individual platelets and aggreagates with thickness less than about 10 nm, and few larger aggregates and tactoids. The oxygen permeability of a 10-mil film of this composite was determined to be 6.0 cc-mil/100 in²-day-atm.

Example 22

The procedure of Example 21 was repeated except that the ammonium used was dodecylamine, hydrochloride, and the clay used was Sumecton-SA, which is a commercial synthetic sodium saponite from Kunimine Ind. Co. and was reported to have a cation exchange capacity of 70 milliequivalents per 100 grams. The final composite had I.V. of 0.63 dL/g, ash residue of 4.3 weight percent, glass transition temperature of 75° C., melting point temperature of 250° C., and diethylene glycol content of 4 mole percent.

Example 23

The procedure of Example 21 was repeated except that the clay used was a calcium montmorillonite refined from a bentonite deposit in Slovakia and was reported to have a cation exchange capacity of 121 milliequivalents per 100 grams. The final composite had I.V. of 0.57 dL/g and ash residue of 2.8 weight percent.

Example 24

This example illustrates the solid state polymerization of a very low I.V. precursor that was prepared using dynamic nitrogen atmosphere only during the melt phase polymerization step. The procedure of Example 1 was repeated except that the melt phase polymerization was stopped when the melt reached a temperature of 280° C. prior to the application of vacuum to give a polyester-platelet precursor with an I.V. of 0.16 dL/g. Dynamic vacuum only (no vacuum) was used during the melt phase polymerization. After solid state polymerization for 48 hours, the final polyester-platelet composite had an I.V. value of 0.55 dL/g and a low shear melt viscosity at 280° C. of $330 \times 10^3$ P. TEM imaging of these polyester-platelet composites show the presence of mostly individual platelets, some aggreagates with thickness less than about 5 nm, and few larger aggregates and tactoids.

Comparative Example 11

This example illustrates the poor dispersion obtained when sodium montmorillonite is used without additional treatment. The melt phase polymerization procedure of Example 16 was repeated except that (1) no cyclohexanedimethanol was used and (2) the platelet particle used was 2 weight percent sodium montmorillonite from Southern Clay Products, which was used without any treatment, and (3) the time for melt phase polymerization was extended until the maximum melt viscosity was obtained. This polyester-platelet composition attained an I.V. of 0.87 in 85 minutes of under vacuum at 280° C. and only has an low shear melt viscosity of $13.3 \times 10^3$ poise. The matrix was found to contain 2.2 mole percent diethylene glycol units, and the composite had a glass transition point of 81° C. and a melting point of 256° C. TEM imaging of this polyester-particle composite showed the presence of very large aggregates, both ordered and disordered, with few small tactoids with thickness less than about 50 nm, and no individual platelets. This material was not solid state polymerized.

A 10-mil thick compression molded film of this composite was found to be rather clear to the naked eye although colored. However, the oxygen permeability of this film was found to be 11.4 cc-mil/100 in$^2$-24 hr-atm, which is about the same as that of the polyester control in Comparative Example 9. Thus, this example show that the use of untreated sodium montmorillonite does not give the desired improvement in permeability or increase in low shear melt viscosity.

Comparative Examples 12–13

The procedure of Example I was repeated except that the platelet particle used was 2 and 5 weight percent Kanupia F from Kunimine Ind. Co., which was used as received without any treatment, and the composites were solid state polymerized for 48 hours. Compression molded 10-mil thick films were clear but contained agglomerates of clay that a visible to the eye. Most of the platelet particles have thickness greater than 100 nm. The analytical results, which are presented in Table 3, show that although these materials are readily solid state polymerized to very high I.V. which have high low-shear melt viscosity, they do not exhibit the desired improvement in permeability.

These comparative examples illustrate the poor dispersion and permeability results obtained when sodium montmorillonite is used without additional treatment. These comparative examples also show that although solid state polymerization can advance the I.V., perhaps enough to eventually achieve a s low shear melt viscosity above about 25,000 poise, solid state polymerization cannot overcome the problem of poor dispersion.

Comparative Examples 14–15

The procedure of Comparative Examples 1–4 was repeated except that the platelet particle used was 2 and 5 weight percent Kanupia F from Kunimine Ind. Co., which was used as received without any treatment, and the composites were solid state polymerized for 48 hours. Compression molded 10-mil thick films were clear but contained agglomerates of clay that a visible to the eye. Most of the platelet particles have thickness greater than 100 nm. The analytical results, which are presented in Table 3, show that these materials do not exhibit the desired improvement in permeability.

These examples illustrate the poor dispersion and permeability results obtained when sodium montmorillonite is used without additional treatment.

TABLE 3

| Comparative Example | Ash (wt %) | I.V. (dL/g) | Low-Shear Melt Viscosity ($10^3$ poise) | Oxygen Permeability (cc-mil/100 in$^2$-24 hr-atm) |
| --- | --- | --- | --- | --- |
| 12 | 1.9 | 1.12 | 200 | 11.9 |
| 13 | 4.7 | 1.27 | 170 | 10.82 |
| 14 | 0.85 | 0.88 | 20.9 | 13.48 |
| 15 | 3.1 | 0.85 | 25.8 | 12.39 |

Example 25

20.0 g of sodium montmorillonite from Southern Clay Products was mixed with 980 ml of water at 60° C. in a Vitamix blender for 60 seconds to form a 2 percent slurry of clay in water. 8.57 g of polyvinylpyrrolidone (10,000 molecular weight) was added to the clay slurry in the Vitamix blender and blended for 60 seconds. 195.7 g of ethylene glycol is then added to the blender based on providing 10 weight percent clay in ethylene glycol and, after mixing for 60 seconds, the water was removed under vacuum at 60° C. in a BUCHI Rotavapor to provide a gel. The gel was analyzed to contain 7.04% ash.

To a 500 ml round bottom flask equipped with a ground glass head, a stirrer, and a nitrogen inlet was added 91.6 grams (0.47 moles) of dimethyl terephthalate, parts per million (ppm) of titanium catalyst in a butanol solution, 55 ppm manganese catalyst in an ethylene glycol solution, 80 ppm cobalt catalyst in an ethylene glycol solution and 230 ppm antimony catalyst in an ethylene glycol solution. Added to this mixture was 113.6 grams of the above gel. The flask was immersed in a Belmont metal bath and was heated for 1.5 hours at 200° C. and 2 hours at 210° C. After this time the theoretical amount of methanol had been collected. 108 ppm of phosphorus catalyst in an ethylene glycoubutanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results:

I.V.=0.33 dL/g; diethylene glycol content=1.82 mole percent; GPC Mw=18200, Mn=6600, Mz=38,700; DSC Tg=78° C, Tm=248° C.; zero shear melt viscosity at 280° C. could not be measured and ash residue=9.5%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 30 hours, heating was discontinued and the solid stating unit was allowed to cool. Analytical results showed the I.V. increased to 0.63 dL/g. The PET nanocomposite was compression molded into a clear film.

Example 26

20.0g of sodium montmorillonite from Southern Clay Products was mixed with 980 ml of water at 60° C. in a Vitamix blender for 60 seconds to form a 2 percent slurry of clay in water. 8.57 g of polyvinylpyrrolidone (10,000 molecular weight) was added to the clay slurry in the Vitamix blender and blended for 60 seconds. 195.7 g of ethylene glycol is then added to the blender based on providing 10 weight percent clay in ethylene glycol and, after mixing for 60 seconds, the water was removed under vacuum at 60° C. in a BUCHI Rotavapor to provide a gel. The gel was analyzed to contain 7.04% ash.

To a 500 ml round bottom flask equipped with a ground glass head, a stirrer, and a nitrogen inlet was added 94.6 grams (0.49 moles) of dimethyl terephthalate, 20.3 grams (0.33 moles) of ethylene glycol, 20 parts per million (ppm) of titanium catalyst in a butanol solution, 55 ppm manganese catalyst in an ethylene glycol solution, 80 ppm cobalt catalyst in an ethylene glycol solution and 230 ppm antimony catalyst in an ethylene glycol solution. Added to this mixture was 71.0 grams of the above gel. The flask was immersed in a Belmont metal bath and was heated for 1.5 hours at 200° C. and 2 hours at 210° C. After this time the theoretical amount of methanol had been collected. 108 ppm of phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.47 dL/g; diethylene glycol content=1.65 mole percent; GPC Mw=29900, Mn=9200, Mz=60,000; DSC Tg=80° C., Tm=247° C.; zero shear melt viscosity at 280° C. could not be measured and ash residue=6.1%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 30 hours, heating was discontinued and the solid stating unit was allowed to cool. Analytical results showed the I.V. increased to 0.83 dL/g. The PET nanocomposite was compression molded into a clear film and had an oxygen permeability of 4.6 cc-mils/100 in²/24 hrs-atm.

Example 27

20.0 g of sodium montmorillonite from Southern Clay Products was mixed is with 980 ml of water at 60° C. in a Vitamix blender for 60 seconds to form a 2 percent slurry of clay in water. 8.57 g of polyvinylpyrrolidone (10,000 molecular weight) was added to the clay slurry in the Vitamix blender and blended for 60 seconds. 195.7 g of ethylene glycol is then added to the blender based on providing 10 weight percent clay in ethylene glycol and, after mixing for 60 seconds, the water is removed under vacuum at 60° C. in a BUCHI Rotavapor to provide a gel. The gel was analyzed to contain 7.04% ash.

To a 500 ml round bottom flask equipped with a ground glass head, a stirrer, and a nitrogen inlet was added 97.6 grams (0.50 moles) of dimethyl terephthalate, 45.6 grams (0.73 moles) of ethylene glycol, 20 parts per million (ppm) of titanium catalyst in a butanol solution, 55 ppm manganese catalyst in an ethylene glycol solution, 80 ppm cobalt catalyst in an ethylene glycol solution and 230 ppm antimony catalyst in an ethylene glycol solution. Added to this mixture was 28.4 grams of the above gel. The flask was immersed in a Belmont metal bath and was heated for 1.5 hours at 200° C. and 2 hours at 210° C. After this time the theoretical amount of methanol had been collected. 108 ppm of phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.61 dL/g; diethylene glycol content=1.11 mole percent; GPC Mw=46600, Mn=12500, Mz=95,000; DSC Tg=80° C., Tm=247° C.; zero shear melt viscosity at 280° C. was 62000 P and ash residue=2.3%. TEM showed a mixture of single platelets, tactoids, and aggregates of tactoids.

The PET nanocomposite was compression molded into a clear film and had an oxygen permeability of 9.3 cc-mils/100 in²/24 hrs-atm.

Example 28

To a 500 ml round bottom flask equipped with a ground glass head, a stirrer, and a nitrogen inlet was added 99.0 grams (0.51 moles) of dimethyl terephthalate, 20.8 grams (0.34 moles) of ethylene glycol, 20 parts per million (ppm) of titanium catalyst in a butanol solution, 55 ppm manganese catalyst in an ethylene glycol solution, 80 ppm cobalt catalyst in an ethylene glycol solution and 230 ppm antimony catalyst in an ethylene glycol solution. Added to this mixture was 46.6 grams of an experimental gel from Nanocor, Inc. designated Nanomer PVP-A and containing 4.29% sodium montmorillonite, 91.06% ethylene glycol, 3.22% water, and 1.43% polyvinylpyrollidone. The flask was immersed in a Belmont metal bath and was heated for 1.5 hours at 200° C. and 2 hours at 210° C. After this time the theoretical amount of methanol had been collected. 108 ppm of phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.52 dL/g; diethylene glycol content=0.79 mole percent; GPC Mw=29400, Mn=10700, Mz=46,700; DSC Tg=76° C., Tm=248° C.; zero shear melt viscosity at 280° C.=45500 P and ash residue=1.9%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 8 hours, heating was discontinued and the solid stating unit was allowed to cool. Analytical results showed the I.V. increased to 0.80 dL/g and the zero shear melt viscosity to 180,000 P. The PET nanocomposite was compression molded into a clear film, which had an oxygen permeability of 8.7 cc-mil/100 in$^2$/24 hrs./atm. verses a value of 10.4 for a PET control.

Example 29

To a 500 ml round bottom flask equipped with a ground glass head, a stirrer, 1.5 and a nitrogen inlet was added 148.5 grams (0.77 moles) of dimethyl terephthalate, 44.7 grams (0.72 moles) of ethylene glycol, 20 parts per million (ppm) of titanium catalyst in a butanol solution, 55 ppm manganese catalyst in an ethylene glycol solution, 80 ppm cobalt catalyst in an ethylene glycol solution, and 230 ppm antimony catalyst in an ethylene glycol solution. Added to this mixture was 56.1 grams of a an experimental gel from Nanocor, Inc. designated Nanomer PVP-B and containing 5.35% sodium montmorillonite, 87.41% ethylene glycol, 4.95% water, and 2.29% polyvinylpyrollidone. The flask was immersed in a Belmont metal bath and was heated for 1.5 hours at 200° C. and 2 hours at 210° C. After this time the theoretical amount of methanol had been collected. 108 ppm phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.61 dL/g; diethylene glycol content=1.00 mole percent; GPC Mw=40300, Mn=12200, Mz=79,500; zero shear melt viscosity at 280° C.=24900 P and ash residue=2.1%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 8 hours, heating was discontinued and the solid stating unit was allowed to cool. Analytical results showed the I.V. increased to 0.80 dL/g. The PET nanocomposite was compression molded into a clear film, which had an oxygen permeability of 5.2 cc-mil/100 in$^2$/24 hrs./atm. verses a value of 9.4 for a PET control.

Example 30

To a 500 ml round bottom flask equipped with a ground glass head, a stirrer, and a nitrogen inlet was added 144.0 grams (0.74 moles) of dimethyl terephthalate, 20 parts per million (ppm) titanium catalyst in a butanol solution, 55 ppm manganese catalyst in an ethylene glycol solution, 80 ppm cobalt catalyst in an ethylene glycol solution and 230 ppm antimony catalyst in an ethylene glycol solution. Added to this mixture was 140.2 grams of a an experimental gel from Nanocor, Inc. designated Nanomer PVP-B and containing 5.35% sodium montmorillonite, 87.41% ethylene glycol, 4.95% water, and 2.29% polyvinylpyrollidone. The flask was immersed in a Belmont metal bath and was heated for 1.5 hours at 200° C. and 2 hours at 210° C. After this time the theoretical amount of methanol had been collected. 108 ppm of phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3 mm screen. Analytical results: I.V.=0.23 dL/g; diethylene glycol content=1.27 mole percent; GPC Mw=8100, Mn=3200, Mz=15800; zero shear melt viscosity at 280° C.=155900 P and ash residue=5.0%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 76 hours, heating was discontinued and the solid stating unit was allowed to cool. Analytical results showed the I.V. increased to 0.54 dL/g. The PET nanocomposite was compression molded into a clear film, which had an oxygen permeability of 4.9 cc-mil/100 in$^2$/24 hrs./atm. verses a value of 9.4 for a PET control.

Example 31

To a 500 ml round bottom flask equipped with a ground glass head, a stirrer, and a nitrogen inlet was added 139.4 grams (0.72 moles) of dimethyl terephthalate, parts per million (ppm) of titanium catalyst in a butanol solution, 55 ppm manganese catalyst in an ethylene glycol solution, 80 ppm cobalt catalyst in an ethylene glycol solution and 230 ppm antimony in an ethylene glycol solution. Added to this mixture was 140.2 grams of a an experimental gel from Nanocor, Inc. designated Nanomer PVP-B and containing 5.35% sodium montmorillonite, 87.41% ethylene glycol, 4.95% water, and 2.29% polyvinylpyrollidone. The flask was immersed in a Belmont metal bath and was heated for 1.5 hours at 200° C. and 2 hours at 210° C. After this time the theoretical amount of methanol had been collected. 108 ppm phosphorus catalyst in an ethylene glycol/butanol solution was added and the temperature increased to 280° C. The pressure in the flask was reduced from atmospheric to between 0.1 to 0.5 mm of Hg over 5 minutes. The temperature was maintained at 280° C. and the pressure between 0.1 to 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.1 1 dL/g; diethylene glycol content 0.71 mole percent; GPC Mw=2200, Mn=1000, Mz=5400; zero shear melt viscosity at 280° C.=1540000 P and ash residue=7.2%. The I.V. could not be increased in the melt due to the inability to stir the highly viscous melt. TEM showed a mixture of single platelets, tactoids, and aggregates of tactoids.

The above ground PET nanocomposite was dried overnight in a vacuum oven at 110° C. with a slight nitrogen purge. The dried material was placed into a glass solid stating unit with a nitrogen purge of 14 SCFH and heated by boiling diethyl succinate which has a boiling point of 218° C. After a period of 76 hours, heating was discontinued and the solid stating unit was allowed to cool. Analytical results showed the I.V. increased to 0.42 dL/g. The PET nanocomposite was compression molded into a clear film, which had an oxygen permeability of 3.4 cc-mil/100 in$^2$/24 hrs./atm. verses a value of 9.4 for a PET control.

Example 32

A nanocomposite material was formed by carrying out the synthesis of the polyester in the presence of a modified montmorillonite clay. The polyester was a copolymer of poly(ethylene terephthalate) in which 8 mole percent of the glycol repeat units were comprised of 1,4-cyclohexanedimethanol. For the synthesis of this material, the appropriate amounts of metal catalyst were added to provide 20 parts per million (ppm) titanium, 55 ppm manganese, 80 ppm cobalt, 230 ppm antimony and 110 ppm phosphorus in the final nanocomposite material. To a 18 gallon (68 liter) stainless steel batch reactor, with intermeshing spiral agitators, was added 9.77 pounds (22.86 moles) of dimethyl terephthalate, 4.44 15 pounds (32.51 moles) of ethylene glycol, 263.5 grams (1.83 moles) of 1,4-cyclohexanedimethanol, 3.56 grams of a butanol solution containing the titanium catalyst and 99.88 grams of an ethylene glycol solution containing the manganese catalyst. Added to this mixture was 1.87 pounds of an experimental gel from Nanocor, Inc. designated Nanomer PVP-A containing 10.91% sodium montmorillonite, 81.71% ethylene glycol, 2.70% water, and 4.68% polyvinylpyrrolidone. The reactor was heated to 200° C. and held for 2 hours with agitation. The temperature was increased to 220° C. and held for 1 hour. 6.97 grams of phosphorus catalyst was added and the temperature was maintained at 220° C. for minutes. 283.85 grams were then added of an ethylene glycol solution containing the cobalt and antimony catalyst and the temperature was increased to 285° C. When the melt temperature reached 270° C., vacuum was applied at a rate of 13 mm per minute. When the pressure had dropped to 1 mm and the melt temperature was 285° C., the polymer was let down to a nitrogen purge. The polymer was extruded into metal pans and ground to pass a 3 mm screen. The polymer had an inherent viscosity of 0.34 dL/g, a zero shear melt viscosity of 2600 P. The polymer contained 1.4 mole percent diethylene glycol and 7.7 mole percent 1,4-cyclohexanedimethanol. The polymer was solid state polymerized in a fluidized bed reactor at 215° C. for 74 hours to an inherent viscosity of 0.94 dL/g and had a s zero shear melt viscosity of 397,000 P.

The PET copolymer nanocomposite was dried at 150° C. for 16 hours and injection molded into amorphous 2-liter preforms on a Cincinnati Milacron injection molding machine. Preforms were reheat stretch blow molded into 2-liter bottles with a 10-mil sidewall. Oxygen permeability of a sidewall was 3.7 cc-mils/100 in$^2$/24 hrs-atm.

Example 33

A nanocomposite material was formed by carrying out the synthesis of the polyester in the presence of a modified montmorillonite clay. The polyester was a copolymer of poly(ethylene terephthalate) in which 8 mole percent of the glycol repeat units were comprised of 1,4-cyclohexanedimethanol. For the synthesis of this material, the appropriate amounts of the metal catalyst were added to provide 20 ppm of Ti, 55 ppm of Mn, 80 ppm of Co, 230 ppm of Sb and 110 ppm of P in the final nanocomposite material.

To a 18 gallon (68 liter) stainless steel batch reactor, with intermeshing spiral agitators, was added 13.29 kilograms (68.59 moles) of dimethyl terephthalate, 3.53 kilograms (57.04 moles) of ethylene glycol, 0.79 kilograms (5.49 moles) of 1,4-cyclohexanedimethanol, 10.95 grams of a butanol solution containing the titanium catalyst and 227.0 grams of an ethylene glycol solution containing the manganese catalyst. Added to this mixture was 5.2 kilograms of an experimental gel from Nanocor, Inc. designated Nanomer PVP-B containing 5.35% sodium montmorillonite, 87.41% ethylene glycol, 4.95% water, and 2.29% polyvinylpyrrolidone. The reactor was heated to 200° C. and held for 2 hours with agitation. The temperature was increased to 220° C. and held for 1 hour. 20.91 grams of phosphorus catalyst was added and the temperature was maintained at 220° C. for 10 minutes. 805 grams were then added of an ethylene glycol solution containing the cobalt and antimony catalyst and the temperature was increased to 285° C. When the melt temperature reached 270° C., vacuum was applied at a rate of 13 mm per minute. When the pressure had dropped to 1 mm and the melt temperature was 285° C., the polymer was let down to a nitrogen purge. The polymer was extruded into metal pans and ground to pass a 3 mm screen. The polymer had an inherent viscosity of 0.25 dL/g, a zero shear melt viscosity of 6600 10 P, and GPC Mw=11400, Mn=5700, Mz=18000. The polymer contained 1.6 mole percent diethylene glycol and 8.1 mole percent 1,4-cyclohexanedimethanol. The polymer was solid state polymerized in a fluidized bed reactor at 215° C. for 60 hours to an inherent viscosity of 0.93 dL/g, a zero shear melt viscosity of 270,000 P and a melt strength at 250° C. of +2.8%. A sample of poly(ethylene terephthalate) copolymer with no sodium montmorillonite was solid stated for 24 hours (control sample). It exhibited an I.V. of 0.85 dL/g. The melt strength of the control sample at 250° C. was −27.2%. Thus, there was a significant increase in the melt strength of the clay/polyester nanocomposite sample as compared to the control sample without clay.

The dried resins were extrusion blow molded on a Bekum EBM-unit. The extruder has an 80-mm diameter, New Castle feed screw. The polymer was extruded at 248° C. and a mold was utilized for a 12 ounce Syrup bottle with no handle. Total cycle time of 10.5 seconds was utilized and the mold was cooled using tap water at 23° C. The 12 ounce bottles made for both the samples were clear. The bottles made for the resin containing the clay also exhibit an amber color due to impurities present in the clay. The crystallinity of polyester in each of the bottle sample was less than 5%. The bottle sidewalls were tested for oxygen permeability at 23° C. using a Modern Control (MOCON) Oxtran 10/50A-permeability tester. Test gases were passed through water bubblers, resulting in about 75% relative humidity. The average film oxygen permeability for the control sample without clay was 11.6 cc-mils/100 in$^2$/24 hrs-atm and for the clay containing nanocomposite sample it was 10.1 cc-mils/100 in$^2$/24 hrs-atm. The haze was determined for the total transmission by test method ASTM D-1003. The opacity of these materials was analyzed employing test method ECDR-A-PO-G-ZPP-4503-1 in which the ratio of the diffuse reflectance of the sample is determined, first with a white reflective tile backing the sample and then a black one. The sample bottle is made from the control resin (no clay) exhibited a haze of 6.27 units and an opacity of 11.78%. The sample bottle comprised of clay containing nanocomposite exhibited a haze of 15.31 and an opacity of 12.23%.

Examples 34–37

Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. Octadecyl methyl bis(polyoxyethylene[15]) ammonium chloride (13.9 grams, 13.0 milliequivalents) was added to the Vitamix blender and the mixture blended at high speed for one minute. The solids formed were removed by filtration on a Buchner funnel. The product was reslurried in 250 ml of water in a Vitamix blender, filtered again, and dried in an air circulating oven at 60° C. for 16 hours.

Dry blended mixtures of ground PET 9921 with varying amounts of the above organoclay were dried overnight in a vacuum oven at 105° C. then compounded in a Leistritz Micro 18 extruder at 275° C. with a die temperature of 280° C. employing a general compounding screw at a rate of 250 rpm. The extrudate was pelletized and characterized. The pellets were crystallized and dried in a vacuum oven at 105° C., then solid state polymerized overnight in a glass glass solid state polymerization unit with a nitrogen purge of about 14 scfh and heated by boiling diethyl succinate which has a boiling point of 218° C. A film with thickness of about 10 mil was compression molded for each sample and was tested for oxygen permeability.

The results are presented in Table 3.

Examples 38–41

The procedure of Examples 34–37 was repeated except that the hydrochloride of aminododecanoic acid (11.9 milliequivalents) was used in place of octadecyl methyl bis(polyoxyethylene[15]) ammonium chloride to prepare the organoclay. The results are presented in Table 3.

Examples 42–44

The procedure of Examples 38–41 was repeated except that the sodium montmorillonite used was Kunupia F supplied by Kunimine Ind. Co. The results are presented in Table 3.

Examples 45–48

The procedure of Examples 34–37 was repeated except that the sodium montmorillonite used was Kunupia F supplied by Kunimine Ind. Co. The results are presented in Table 3.

TABLE 4

| Example | Ash (wt %) ASTM D5630-94 | Precursor IV (dL/g) | Final IV (dL/g) | Oxygen Permeability (cc-mil/100 in$^2$-24 hr-atm) |
|---|---|---|---|---|
| 34 | 1.51 | 0.49 | 0.70 | 10.1 |
| 35 | 3.9 | 0.42 | 0.44 | 9.9 |
| 36 | 4.35 | 0.42 | 0.51 | 10.1 |
| 37 | 5.82 | 0.36 | 0.52 | 10.4 |
| 38 | 1.81 | 0.50 | 0.67 | 10.2 |
| 39 | 4.29 | 0.39 | 0.59 | 9.4 |
| 40 | 4.32 | 0.39 | 0.62 | 9.0 |
| 41 | 6.73 | 0.33 | 0.57 | 9.5 |
| 42 | 1.34 | 0.46 | 0.70 | 8.7 |
| 43 | 3.45 | 0.40 | 0.60 | 9.6 |
| 44 | 4.54 | 0.41 | 0.51 | 9.9 |
| 45 | 5.69 | 0.34 | 0.65 | 10.4 |
| 46 | 1.88 | 0.50 | 0.72 | 10.0 |
| 47 | 4.7 | 0.42 | 0.64 | 9.5 |
| 48 | 7.12 | 0.31 | 0.48 | 8.3 |

The above examples show that (1) extrusion compounding alone does not provide polyester composites with the desired I.V. and (2) after solid state polymerization, desirable I.V.'s and oxygen permeabilities are achieved.

Comparative Examples 15–22

The procedure of Examples 34–37 was repeated using a wide variety of ammonium salts as depicted in Table 4. These comparative examples show that (1) extrusion compounding alone does not provide polyester composites with the desired I.V. and low shear melt viscosity and (2) desirable melt viscosity and oxygen permeability are not obtained with some treated clays. To achieve desirable oxygen permeability with the clays used in these comparative examples, further treatment or alternate treatment of clay must be used.

We claim:

1. A polymer composite composition comprising about 0.01 to about 25 weight percent based on the weight of the composition of a clay material having a cation exchange capacity between about 0.3 and about 3 meq/g comprising platelet particles dispersed in at least one polyester wherein the majority of said platelet particles have a thickness in the shortest dimension of less than about 20 nm and wherein said composition is solid state polymerized and has an I.V. of greater than about 0.55 dl/g, low shear melt viscosity greater than about 25,000 poise and a gas permeability which is at least 10% lower than that of unmodified polyester.

2. The composition of claim 1 wherein composition comprises up to about 99.9 wt % of said polyester.

3. The composition of claim 1 wherein composition comprises between 99.5 wt % and about 50 wt % polyester, between 0.5 and about 25 wt % platelet particles and up to about 30 wt % of at least one dispersing aid, pretreatment compound or mixture thereof.

4. The composition of claim 3 wherein composition comprises between about 75 wt % to about 99.5 wt % polyester and between 0.5 and about 15 wt % platelet particles.

5. The composition of claim 3 wherein composition comprises between about 99.5 wt % to about 85 wt % polyester and between 0.5 and about 10 wt % platelet particles.

6. The composition of claim 1 wherein said I.V. is between about 0.6 and about 1.2 dL/g.

7. The composition of claim 1 wherein said platelet particles are derived from chemically modified or synthetic clays.

8. The composition of claim 1 wherein said platelet particles are individual layers of the swellable layered particles having a thickness of less than 2 nm and a diameter between about 10 to about 2000 nm.

9. The composition of claim 8 wherein said swellable layered particles are selected from the group consisting of mica-type layered phyllosilicates, including clays, smectite clays, montmorillonites, bentonites, hectorites, synthetic hectorites, and mixtures thereof.

10. The composition of claim 1 wherein said polyester is derived from an acid component comprising at least 50 mol % of a dibasic acid selected from the group consisting of terephthalic, isophthalic, naphthalenedicarboxylic, 1,4-cyclohexanedicarboxylic acid and mixtures thereof; and at least one glycol selected from the group consisting of glycols having two to about ten carbon atoms.

11. The composition of claim 10 wherein said dibasic acid further comprises up to about 50 mole percent of one or more different dicarboxylic acids selected from the group consisting of aromatic dicarboxylic acids having 8 to 14 carbon atoms; aliphatic dicarboxylic acids having 4 to 12 carbon atoms and cycloaliphatic dicarboxylic acids having 8 to 12 carbon atoms.

12. The composition of claim 10 wherein said dibasic acid further comprises at least one second acid selected from the group consisting of terephthalic acid, phthalic acid, isophthalic acid, 1,4-, 1,5-, 2,6-, and 2,7-naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid and mixtures thereof.

13. The composition of claim 10 wherein said glycol is selected from the group consisting of ethylene glycol, 1,4-butanediol, 1,6-hexanediol, 1,4-cyclohexanedimethanol, diethylene glycol and mixtures thereof.

14. A shaped article formed from the composition of claim 1.

15. The article of claim 14 wherein said article is selected from the group consisting of films, sheets, containers, tubes and pipes.

16. The article of claim 14, wherein said article is a container formed via extrusion or stretch blow molding.

17. A process for preparing a high I.V. polymer composite composition comprising the step of solid state polymerizing a precursor composition comprising about 0.01 to about 25 weight percent based on the weight of the composition of a clay material having a cation exchange capacity between about 0.3 and about 3 meq/g comprising platelet particles dispersed in at least one polyester under conditions sufficient to increase I.V. and produce a polyester-platelet particle composite having an I.V. of greater than about 0.55 dL/g and a gas permeability which is at least 10% lower than that of unmodified polyester, wherein the majority of said platelet particles have a thickness in the shortest dimension of less than about 20 nm.

18. The process of claim 17 wherein said composite has a low shear melt viscosity of greater than about 25,000 poise.

19. The composition of claim 1 wherein said composition further comprises a shear melt viscosity of greater than about 30,000 poise.

20. The process of claim 18 wherein said precursor composition is formed by introducing treated or untreated platelet particles into a melt polymerization reaction.

21. The process of claim 17 further comprising the steps of (1) dispersing said platelet particles into ethylene glycol, optionally with the addition of a swelling aid, (2) adding at least one diester of a dicarboxylic acid or a dicarboxylic acid and catalysts to said platelet particles, and (3) conducting melt phase polymerization.

22. The process of claim 17 wherein said precursor composition is formed by a process comprising contacting treated or untreated platelet particles and said polyester in a melt compounding extrusion process.

23. The process of claim 17 wherein said precursor composition is formed by a process comprising (1) dry mixing said polyester with treated or untreated platelet particles and (2) passing the mixture through a compounding extruder under conditions sufficient to melt the polyester.

* * * * *